United States Patent
Tzirkel-Hancock et al.

(10) Patent No.: US 10,090,000 B1
(45) Date of Patent: Oct. 2, 2018

(54) EFFICIENT ECHO CANCELLATION USING TRANSFER FUNCTION ESTIMATION

(71) Applicant: GM Global Technology Operations LLC, Detroit, MI (US)

(72) Inventors: Eli Tzirkel-Hancock, Ra'anana (IL); Ilan Malka, Tel Aviv (IL); Vladimir Tourbabin, Sammamish, WA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/800,523

(22) Filed: Nov. 1, 2017

(51) Int. Cl.
*H04R 3/00* (2006.01)
*H04B 3/20* (2006.01)
*G10L 21/0232* (2013.01)
*H04R 1/02* (2006.01)
*H04R 1/40* (2006.01)
*G06F 3/16* (2006.01)
*G10L 21/0208* (2013.01)

(52) U.S. Cl.
CPC .......... *G10L 21/0232* (2013.01); *H04R 1/028* (2013.01); *H04R 1/406* (2013.01); *H04R 3/005* (2013.01); *G06F 3/167* (2013.01); *G10L 2021/02082* (2013.01); *H04R 2499/13* (2013.01)

(58) Field of Classification Search
CPC . H04R 3/00; H04R 3/02; H04R 3/005; H04R 1/1083; H04R 1/028; H04R 1/406; H04R 2499/13; H04R 2410/01; H04R 2410/05; G10L 21/0232; G10L 21/02; G10L 21/02082; G10L 21/0208; G10L 2021/02166; G06F 3/167; G10K 11/178; G10K 2210/108; G10K 2210/1082; H04M 9/082; H04B 3/20
See application file for complete search history.

(56) References Cited

U.S. PATENT DOCUMENTS

| | | | | |
|---|---|---|---|---|
| 5,371,789 | A * | 12/1994 | Hirano | H04M 9/082 370/290 |
| 9,319,783 | B1 * | 4/2016 | Barton | G10L 21/0208 |
| 2002/0015500 | A1 * | 2/2002 | Belt | H04M 9/082 381/66 |
| 2004/0174991 | A1 * | 9/2004 | Hirai | H04R 3/02 379/406.08 |
| 2005/0058278 | A1 * | 3/2005 | Gallego Hugas | G10L 21/0208 379/406.01 |

(Continued)

*Primary Examiner* — Thang Tran
(74) *Attorney, Agent, or Firm* — Cantor Colburn LLP

(57) ABSTRACT

Technical solutions are described for acoustic echo cancellation. An example method includes computing, by a beamformer, a plurality of updated beamformer filter coefficients, the beamformer filter coefficients computed adaptively to determine a speech signal from a plurality of input audio signals. Further, the method includes computing, by a transfer function estimator, a relative transfer function based on the updated beamformer filter coefficients and a plurality of present acoustic echo canceller coefficients. Further, the method includes adjusting a plurality of acoustic echo canceller coefficients using the relative transfer function, and generating an output speech signal, by the acoustic echo canceller, by cancelling echo components from the speech signal using the adjusted filter coefficients. Further, the method includes sending, by the acoustic echo canceller, the output speech signal to a far end speech device.

20 Claims, 4 Drawing Sheets

(56) References Cited

U.S. PATENT DOCUMENTS

| | | | | |
|---|---|---|---|---|
| 2006/0233353 | A1* | 10/2006 | Beaucoup | H04M 9/082 379/406.01 |
| 2006/0250998 | A1* | 11/2006 | Beaucoup | H04R 3/005 370/286 |
| 2009/0316923 | A1* | 12/2009 | Tashev | H04R 3/005 381/66 |
| 2010/0215184 | A1* | 8/2010 | Buck | H04R 1/406 381/66 |
| 2013/0315408 | A1* | 11/2013 | Yano | G10K 11/175 381/66 |

* cited by examiner

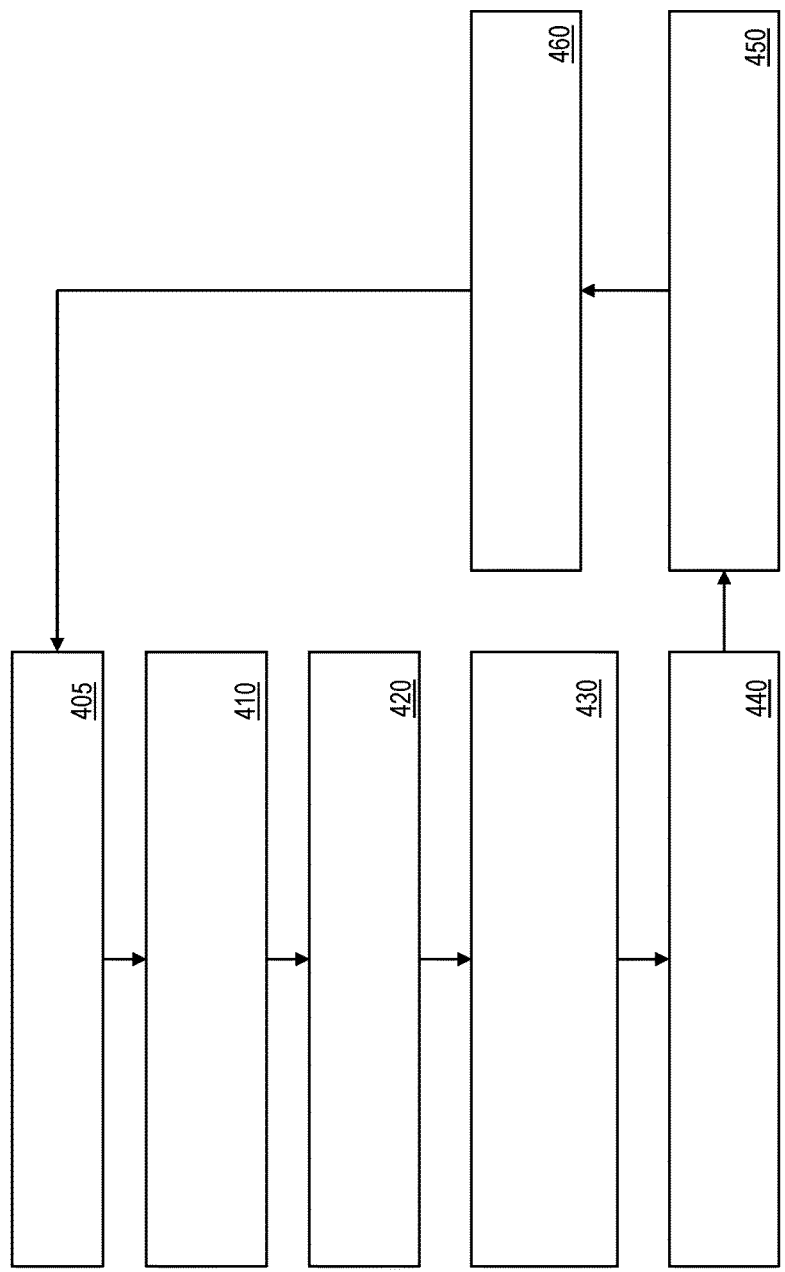

EFFICIENT ECHO CANCELLATION USING TRANSFER FUNCTION ESTIMATION

INTRODUCTION

The subject disclosure generally relates to infotainment systems, and particularly echo cancellation when interacting with infotainment systems, and more particularly to systems and methods for echo cancellation for multiple microphones.

Modern vehicles, such as automobiles, are often equipped with infotainment systems to facilitate communication between occupants of the vehicle and a person on a far end device, such as a cellular phone. For instance, a hands free calling system may use one or more microphones in the vehicle cabin to transmit audible communications from the vehicle occupants to a remote caller while broadcasting far end speech from the remote caller over the vehicle's audio system. However, the broadcasted far end speech may be received by the microphones and consequently result in unwanted feedback and acoustic echo in the signal transmitted to the remote caller. As such, the remote caller may hear an acoustic echo in the signal received from the hands free calling system.

Accordingly, it is desirable to provide systems and methods for echo cancellation in a cabin that allows echo cancellation of far end speech for multiple microphones with a minimized number of acoustic echo cancellation modules (AECMs). In addition, it is desirable to enhance communications between occupants in the cabin and a far end device. Other desirable features and characteristics of the present invention will become apparent from the subsequent detailed description and the appended claims, taken in conjunction with the accompanying drawings and the foregoing technical field and background.

SUMMARY

In one exemplary embodiment an example method includes computing, by a beamformer, a plurality of updated beamformer filter coefficients, the beamformer filter coefficients computed adaptively to determine a speech signal from a plurality of input audio signals. Further, the method includes computing, by a transfer function estimator, a relative transfer function based on the updated beamformer filter coefficients and a plurality of present acoustic echo canceller coefficients. Further, the method includes adjusting a plurality of acoustic echo canceller coefficients using the relative transfer function, and generating an output speech signal, by the acoustic echo canceller, by cancelling echo components from the speech signal using the adjusted filter coefficients. Further, the method includes sending, by the acoustic echo canceller, the output speech signal to a far end speech device.

In one or more examples, the relative transfer function is computed as $E = (H1*F'1 + H2*F'2 + \ldots Hn*F'n)/(H1*F1 + H2*F2 + \ldots Hn*Fn)$, where Hi are the plurality of acoustic echo canceller coefficients at present, Fi are a plurality of beamformer filter coefficients at present, F'i are the plurality of updated beamformer filter coefficients, and e is the relative transfer function.

In one or more examples, the method further includes adapting, by the acoustic echo canceller, the adjusted acoustic echo canceller coefficients to updated acoustic echo canceller coefficients based on changes in cabin acoustics.

Further, in one or more examples, the acoustic echo canceller coefficients are modified by performing a convolution of the acoustic echo canceller coefficients and the relative transfer function.

In one or more examples, the input audio signals are received from a microphone array comprising a plurality of microphones. Further, a single acoustic echo canceller is used irrespective of a number of microphones in the microphone array. In one or more examples, the output speech signal includes a command for the far end speech device.

In another exemplary embodiment a vehicle infotainment system includes a microphone array that includes multiple microphones located in a cabin of a vehicle. The vehicle infotainment system further includes a loudspeaker that broadcasts an output audio signal. Further, the vehicle infotainment system includes a acoustic echo cancellation (AEC) system to cancel acoustic echo of the output audio signal from multiple input audio signals received by the microphone array. The AEC system includes a beamformer that computes multiple updated beamformer filter coefficients, the beamformer filter coefficients computed adaptively to determine a speech signal from the input audio signals. The AEC system further includes a transfer function estimator that computes a relative transfer function based on the updated beamformer filter coefficients and a plurality of present acoustic echo canceller coefficients. Further yet, the AEC system includes an acoustic echo canceller, wherein acoustic echo canceller coefficients are adjusted using the relative transfer function, the acoustic echo canceller configured to generate the output audio signal by cancelling echo components from the speech signal using the adjusted echo canceller coefficients.

In one or more examples, the relative transfer function is computed as $E = (H1*F'1 + H2*F'2 + \ldots Hn*F'n)/(H1*F1 + H2*F2 + \ldots Hn*Fn)$, where Hi are the plurality of acoustic echo canceller coefficients at present, Fi are a plurality of beamformer filter coefficients at present, F'i are the plurality of updated beamformer filter coefficients, and e is the relative transfer function.

In one or more examples, the the acoustic echo canceller further adapts the adjusted acoustic echo canceller coefficients to updated acoustic echo canceller coefficients based on changes in cabin acoustics. Further, in one or more examples, the acoustic echo canceller coefficients are modified by performing a convolution of the acoustic echo canceller coefficients and the relative transfer function.

In one or more examples, the input audio signals are received from a microphone array comprising a plurality of microphones. Further, a single acoustic echo canceller is used irrespective of a number of microphones in the microphone array. In one or more examples, the output speech signal includes a command for the far end speech device.

In yet another exemplary embodiment a computer program product includes a storage memory device having computer executable instructions stored therein. The computer executable instructions when executed by a processing unit cause the processing unit to perform acoustic echo cancellation. The acoustic echo cancellation (AEC) includes computing, by a beamformer, a plurality of updated beamformer filter coefficients, the beamformer filter coefficients computed adaptively to determine a speech signal from a plurality of input audio signals. Further, the AEC includes computing, by a transfer function estimator, a relative transfer function based on the updated beamformer filter coefficients and a plurality of present acoustic echo canceller coefficients. Further, the AEC includes adjusting a plurality of acoustic echo canceller coefficients using the relative transfer function, and generating an output speech signal, by the acoustic echo canceller, by cancelling echo components from the speech signal using the adjusted filter coefficients. Further, the AEC includes sending, by the acoustic echo canceller, the output speech signal to a far end speech device.

In one or more examples, the relative transfer function is computed as $E=(H1*F'1+H2*F'2+ \ldots Hn*F'n)/(H1*F1+H2*F2+ \ldots Hn*Fn)$, where Hi are the plurality of acoustic echo canceller coefficients at present, Fi are a plurality of beamformer filter coefficients at present, F'i are the plurality of updated beamformer filter coefficients, and e is the relative transfer function.

In one or more examples, the the acoustic echo canceller further adapts the adjusted acoustic echo canceller coefficients to updated acoustic echo canceller coefficients based on changes in cabin acoustics. Further, in one or more examples, the acoustic echo canceller coefficients are modified by performing a convolution of the acoustic echo canceller coefficients and the relative transfer function.

In one or more examples, the input audio signals are received from a microphone array comprising a plurality of microphones. Further, a single acoustic echo canceller is used irrespective of a number of microphones in the microphone array. In one or more examples, the output speech signal includes a command for the far end speech device.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which:

FIG. 4. is a flowchart of an example method for efficient acoustic echo cancellation according to one or more embodiments.

DETAILED DESCRIPTION

Figure 1:
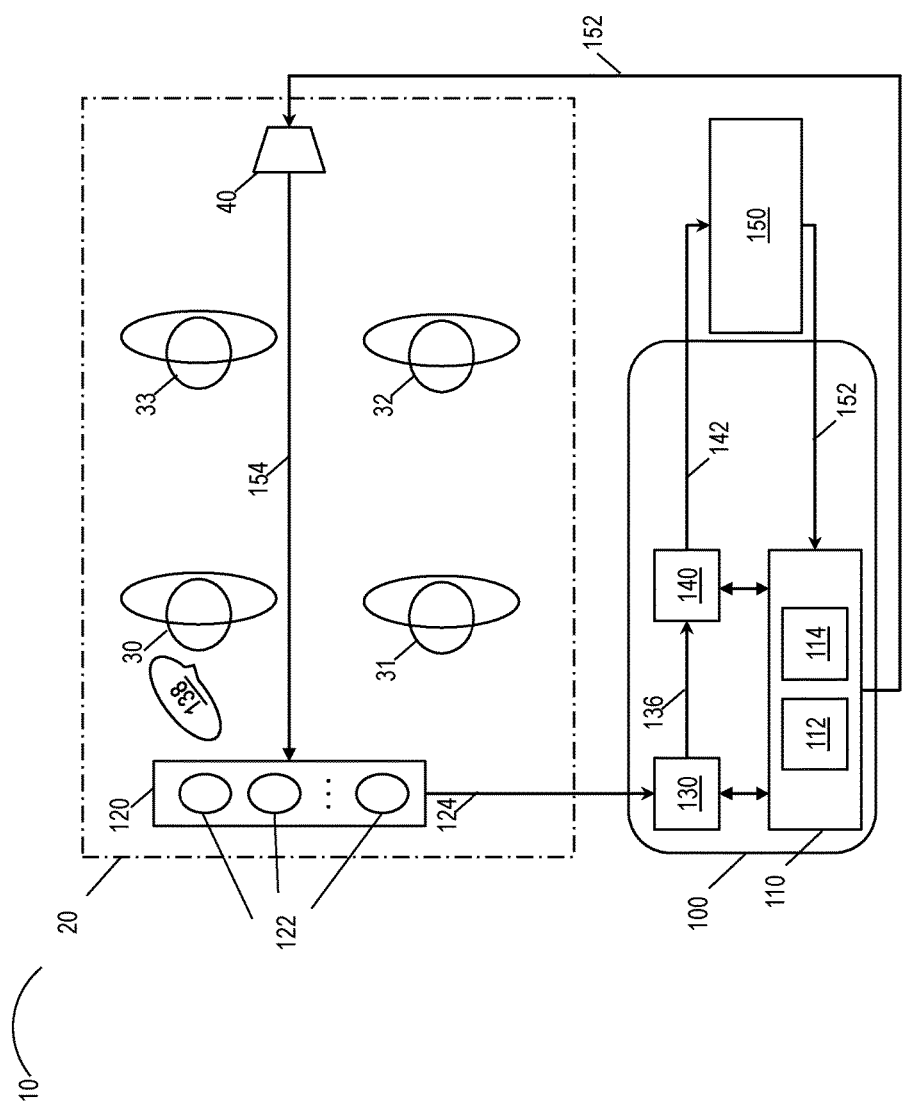
FIG. 1 illustrates a vehicle having the acoustic processing system in accordance with an exemplary embodiment.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Referring to the Figures, wherein like numerals indicate like parts throughout the several views, a vehicle 10 having a cabin 20 and an acoustic processing system 100 is shown herein. In the exemplary embodiments, the vehicle 10 is an automobile. However, the acoustic processing system 100 may be implemented and/or utilized in other types of vehicles or in non-vehicle applications. For instance, other vehicles include, but are not limited to, aircraft, spacecraft, buses, trains, etc. As shown in FIG. 1, the acoustic processing system 100 includes a far end speech control module 110 having a processor module 112 and a memory 114, a microphone array 120, a beam forming module 130, an acoustic echo canceller module 140, and a source of far end speech 150.

With reference to FIG. 1, an embodiment of the acoustic processing system 100 is provided. The vehicle 10 includes the microphone array 120 to pick up audible commands and communications from occupants 30, 31, 32, and 33 in the cabin 20. In one example, the microphone array 120 is used to receive audible commands and communications from a speaking occupant 30. In one example, the microphone array 120 receives audible commands to enable the speaking occupant 30 to communicate via speech recognition with one or more vehicle systems, such as infotainment systems, etc. over a vehicle communication bus.

The vehicle 10 uses the microphone array 120 and a loudspeaker 40 to enable vehicle occupants 30-33 to communicate with a far end speech device 150, such as a remote mobile phone that is distant from the vehicle 10. The audio received from the far end speech device 150 is broadcasted over the loudspeaker 40 so that the vehicle occupants 30-33 can hear the communications from the far end speech device 150. However, the audible far end speech 154 can be picked up by the microphone array 120 and subsequently rebroadcasted to the far end speech device 150 as an echo. As such, the acoustic echo cancellation 100 improves communications between the far end speech device 150 and the vehicle occupants 30-33 in the cabin 20 by eliminating, or at least reducing such an echo.

The acoustic processing system 100 includes the far end speech control module 110, the microphone array 120, the beam forming module 130, and the acoustic echo canceller module 140. The system 100 sends/receives data to/from the far end speech device 150. While the components of the acoustic processing system 100 are depicted in communication through a direct connection for simplicity, one skilled in the art will appreciate that the acoustic processing system 100 may be implemented over a vehicle communication bus such as a CAN bus, FlexRay, A2B bus or other known communication busses.

The far end speech control module 110 transmits and receives data within the acoustic processing system 100 and has the processor module 112 and the memory 114. The processor module 112 performs computing operations and accesses electronic data stored in the memory 114. The memory 114 may include a predetermined location of a speaking occupant 30-33, predetermined acoustic zones in the cabin 20, or other predetermined spatial relationships relating to the vehicle cabin 20. The memory 114 may alternatively, or in addition, include one or more computer executable instructions to implement the technical solutions described herein.

The far end speech control module 110 detects and receives a far end speech signal (R) 152 originating from the source of far end speech 150 which is in turn broadcast in the cabin 20 using the loudspeaker 40 as the audible far end speech 154. By receiving the far end speech signal 152 as an input, the acoustic processing system 100 is able to acoustically remove the far end speech signal (R) 152 from the cabin output signal 142 provided to the source of far end speech 150, thus removing the echo.

The microphone array 120 includes at least two microphones 122 and receives audible communications from a speaking occupant (not shown) and generates a microphone signal 124 therefrom. In one or more examples of the acoustic processing system 100, the microphones 122 in the microphone array 120 are arranged proximate to one another in the cabin. One skilled in the art will appreciate that the microphones 122 in the microphone array 120 form a phased sensor array and therefore should be located reasonably close to one another. In one or more examples, the microphones 122 are arranged to form zones in the cabin 20 with one microphone 122 per zone. In one or more examples, there are at least two microphones 122 per zone. In one or more examples, the microphones 122 are arranged in the cabin 20 so that there is one dedicated microphone 122 per occupant 30-33. In one or more examples, there are at least two microphones 122 per occupant 30-33.

The beam forming module 130 forms a main beam 138 directed at the speaking occupant 30. The beam forming module 130 may be any type of beam forming module, for example a fixed beam former, an adaptive beam former, or any other type. Based on the detection of the far end speech signal 152 by the far end speech control module 110, the beam forming module 130 forms a main beam 138. In one or more examples, for example, an adaptive beam former, the beam orientation may vary dynamically depending on occupant position, interference and acoustic conditions in the cabin.

Adaptive beam forming or spatial filtering is a technique that uses sensor arrays to provide directional signal reception. By making use of a phased array, signals at particular angles experience constructive interference while signals at other angles experience destructive interference. In this way, beam forming provides a method for constructing a spatial filter to selectively increase the amplitude of signals received at some angles while simultaneously reducing the amplitude of signals received at other angles.

Figure 2:
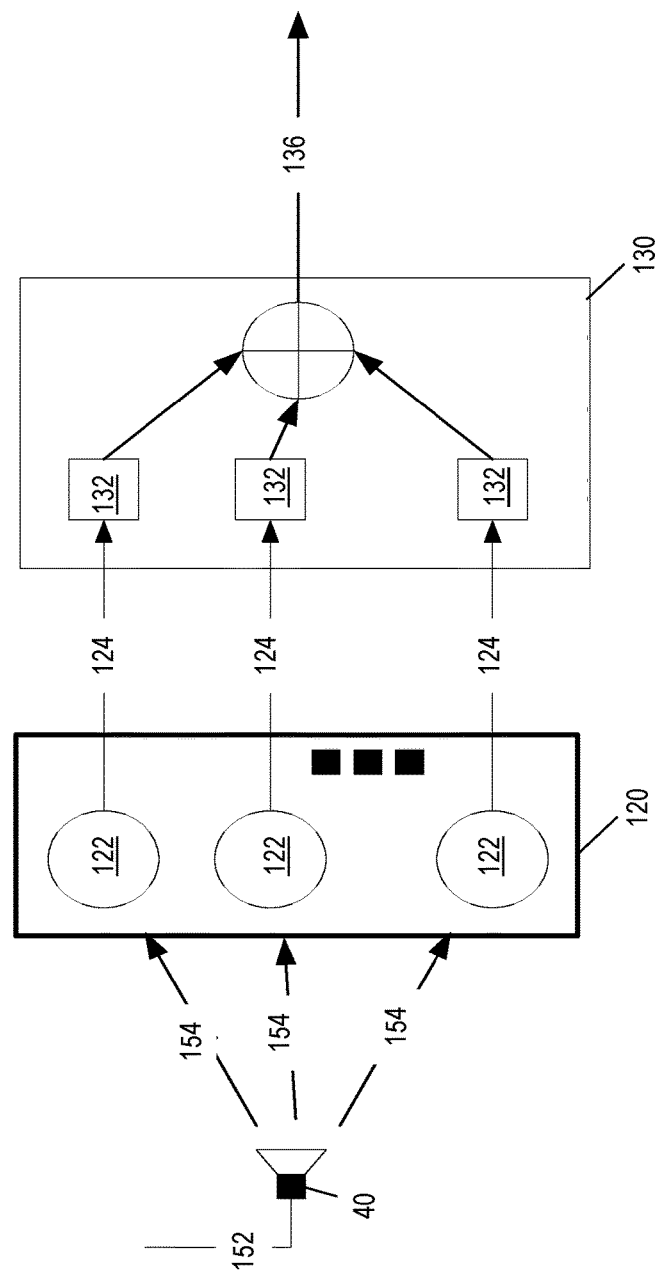
FIG. 2 depicts a block diagram of an example beamformer module according to one or more embodiments.

FIG. 2 depicts a block diagram of an example beamformer module 130 according to one or more embodiments. The beamformer 130 receives input signal 124 from the microphone array 120, which includes multiple audio signals from the one or more microphones 122. Each of these signals includes echo components which the microphones 122 capture from the output 154 of the loudspeaker 40. The beamformer 130 includes one or more filtering modules 132 that are adaptively configured to form the spatial filter. The filtering modules 132 are configured by adjusting corresponding filtering coefficients F1, F2, . . . , Fn.

The signal processing performed by the beamformer 130 may be a summation of filtered input signals, wherein the filtered input signals may comprise, for example, time delay compensated microphone signals 124. The coefficients ($F_x$) of the filtering module, in particular the value of each coefficient, may be variable.

It should be noted that in other examples, the adaptive filtering may be performed in any other manner than what is described herein. The beamformer 130 thus combines microphone signals 124 from each of the at least two microphones in 122 such a way that signals from a preferred direction or speaking direction are enhanced while signals from other directions are suppressed.

The location of the speaking occupant 30 is implicitly identified in the beam forming adaptation of the adaptive beam former 130. The location of the speaking occupant 30 may also be a predetermined location stored in the memory 114 as detailed above.

The location of the speaking occupant 30 may also be identified by the beam former 130 by minimizing the variance of the adaptive beam former output signal as is known to those skilled in the art. The beam former 130 may further make use of algorithms such as the Linear Constrained Minimum Variance (LCMV) algorithm to implicitly estimate the location of the speaking occupant 30. In an embodiment, the location of the speaking occupant 30 is predetermined. In an embodiment, a vehicle sensor (not shown) such as a seat sensor provides information relating to the location of the occupants 30-33 relative to the microphone array 120. For example, a seat sensor may be used to determine if a front seat passenger 31 is in the cabin 20. The sensor may also provide information relating to the location of the driver 30 on the seat.

Adaptive beam forming is achieved by filtering and processing the microphone signal 124 from the microphone array 120 and combining the beam forming outputs. The beam forming module 130 can be used to extract the desired signal and reject interfering signals according to their spatial location. In this way, the beam forming module 130 processes signals received by the microphone array 120 to extract desired communications such as the speaking occupant's 30 voice while rejecting unwanted signals such ambient noise in the cabin 20. The beamformer output (Y) 136 is forwarded to the acoustic echo canceller 140 for further processing.

In one or more examples, the acoustic echo canceller 140 is provided with an input signal for the loudspeaker 40, i.e. the loudspeaker signal 152. An echo signal may correspond to the loudspeaker signal 152. In particular, the echo signal may be output by the loudspeaker. The echo signal may correspond, for example, to output of a hands-free system.

The acoustic echo canceller 140 uses the loudspeaker signal 152 as a reference signal to model an echo signal component in the beamformed signal 136. For example, the acoustic echo canceller 140 estimates the signal components of the beamformed signal 136, which correspond to an echo signal. In other words, the acoustic echo canceller 140 models a serial connection of a loudspeaker-room-microphone system and a beamformer, by determining a transfer function (R). A transfer function may model the relation between the input and the output signals of a system. In particular, a transfer function applied to an input signal may yield the output signal of the system. Transfer functions of the loudspeaker-cabin-microphone system may represent the relation between a loudspeaker signal, output by the loudspeaker and received by the microphones via the room, and the microphone signals, output by each of the microphones.

The acoustic echo canceller 140 includes an echo compensation filter or an acoustic echo canceller module. In one or more examples, the echo compensation filter may include one or more finite impulse response (FIR) filters. The number of filter coefficients in each set of filter coefficients for the acoustic echo canceller 140 depends on the order of the FIR filter used, i.e. the number of filter coefficients used for the FIR filter. An $N^{th}$ order FIR filter may use (N+1) filter coefficients. Therefore, the number of filter coefficients in each or in an arbitrarily chosen set of filter coefficients may take any finite value larger than one, and is based on the acoustic properties of the cabin 20.

A transfer function of the serial connection of the loudspeaker-cabin-microphone system 120 and the beamformer 130, or loudspeaker-cabin-microphone-beamformer system, may represent the relation between a loudspeaker signal 154 output by the loudspeaker 40, and the beamformed signal (Y) 136. The transfer function may be based on filter coefficients Hx of one or more filters of the acoustic echo canceller 140, and beamformer filter coefficients Fx, to describe a relation between the loudspeaker input and the acoustic echo canceller output.

For example, the transfer function of the acoustic echo canceller 140 may be expressed as a sum of convolution operations between the echo canceller filter coefficients Hx, and the beamformer coefficients Fx: H1F1+H2F2+ ... HnFn. The output of the audio processing system 100 can thus be expressed as Y=R(H1F1+H2F2+ ... HnFn). Here R is the loudspeaker input signal 152, Fx are beamformer coefficients, Y is beamforming output 136, and Hx represents acoustic echo canceller coefficients that remove echo from the beamformed signal Y to generate the loudspeaker output 154. In one or more examples, H1, H2 ... Hn can be considered constants and known for the vehicle 10, at least at an initial state. Further, F1, F2 ... Fn are the beamformer coefficients, and the initial beamformer coefficients are also known values, until adaptation begins. Acoustic changes in H1, H2 ... Hn, are learned adaptively by the acoustic echo canceller 140 as the echo is detected in the microphone signals 124.

For hands-free telephone sets or speech recognition systems in a vehicle 10, echo compensation is a technical challenge. Disturbing echoes may result from signals which are, for example, output by a loudspeaker 40 of the same system and detected together with the wanted signal by microphones 122 of a microphone array 120. In the case of a hands-free telephone set, for instance, signals from a far end are output by the loudspeaker 40 at the near end where they are again detected by the microphones 122. In order to avoid that these signals are transmitted back to the far end, echo compensation or echo cancellation is performed. Several methods and systems for echo compensation are known (see, e.g. Acoustic Echo and Noise Control, E. Hänsler and G. Schmidt, John Wiley & Sons, New York, 2004).

One or more examples use a separate acoustic echo canceller, for example an acoustic echo canceller 140, for each microphone signal. This method yields a very robust echo compensation but is computationally intensive. In particular, the computational costs increase with the number of microphones 122 in the microphone array 120.

The technical solutions described herein, as depicted in FIG. 1, use only one acoustic echo canceller, for example the acoustic echo canceller 140, which operates after the beamformer 130, i.e. which operates on the beamformed signal 136. This method is more computationally efficient than using multiple cancellers, as it requires only one acoustic echo canceller independent of the number of microphones 122 in the microphone array 120.

A technical challenge when using only one, i.e. a single, acoustic echo canceller operating on the beamformed signal 136 is that the residual echo components in the echo compensated signal 154 are observed when the beamformer 130 changes from one direction to another. For example, in the vehicle 10, the beamformer 130 may adapt and generate different beamformer filter coefficients Fx as the speaker, for example occupant 31, makes some movements or as background noise in the cabin 20 changes (for example, because of changes to road type/conditions etc.). Based on the one or more embodiments described herein, the acoustic echo canceller 140 does not have to adjust to the changes in the beamformer coefficients. A transfer estimator 310 (FIG. 3) computes the relative transfer function, and modifies the filter coefficients acoustic echo canceller 140 using the relative transfer function.

After the change-over from the first direction to the second direction, the signal quality of the echo compensated beamformed signal 154 can be impaired by the presence of a residual echo signal until the acoustic echo canceller 140 has re-adapted for the second direction. This, however, may take some time.

The technical solutions described herein address such technical challenges by facilitating the acoustic processing system 100 to predict the beamformer influence on the echo path. The prediction facilitates using the single acoustic echo canceller 140 on the beamformer output 136 without additional computation that leads to a performance degradation, or without using multiple echo cancellers—one for each microphone 122.

Figure 3:
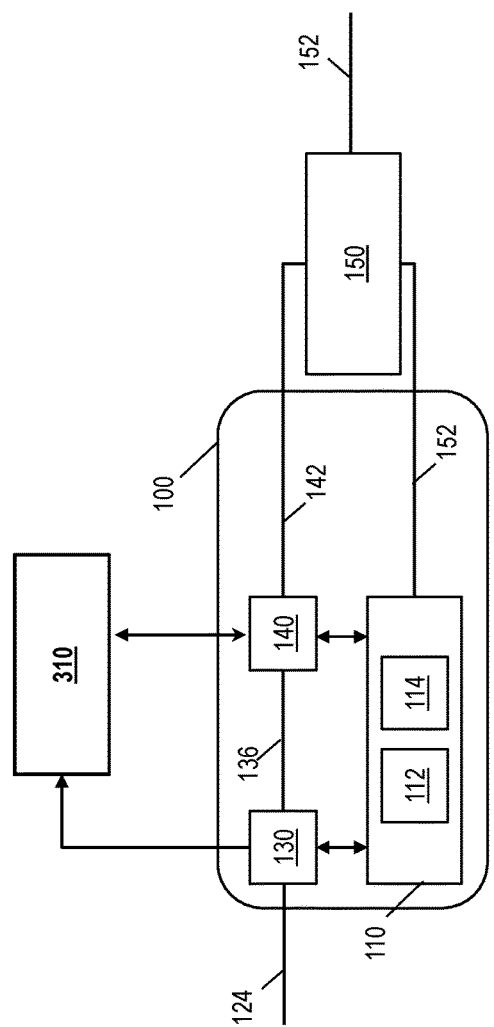
FIG. 3 depicts a block diagram of the acoustic processing system according to one or more embodiments.

FIG. 3 depicts a block diagram of the acoustic processing system 100 according to one or more embodiments that implements the technical solutions described herein. The acoustic processing system 100 includes a transfer function estimator 310 in addition to the other components described herein (see FIG. 1). The transfer function estimator 310 receives a current state of the acoustic echo canceller 140, and the filter coefficients (Fx) of the beamformer 130. The beamformer 130, in one or more examples, sends the beamformer filter coefficients each time the coefficients are adapted as described herein. In response, the transfer function estimator 310 computes a relative transfer function E as a ratio of between a first transfer function between the beamformer 130 and the acoustic echo canceller 140 after the beamformer filter coefficients are updated because of adaptation and a second transfer function between them prior to the update. Further, the transfer function estimator 310 modifies the filter coefficients of the acoustic echo canceller 140 using the relative transfer function for filtering the echo from the beamformer output 136. For example, the modification may include performing a convolution of the relative transfer function and the filter coefficients of the acoustic echo canceller 140. It should be noted that other modifications may be performed in other examples.

The acoustic echo canceller 140, does not have to be adapted to the changes in the beamformer 130, and thus avoiding computationally expensive re-adaptation. The acoustic echo canceller 140 continues to adapt to changes in the acoustics of the cabin 20, such as because of changes in the road conditions etc.

Determining the relative transfer function E includes performing a convolution between Hx and Fx each time the beamformer coefficients are adjusted. Thus, the relative transfer function E is relatively computationally inexpensive compared to readapting the acoustic echo canceller 140 because computing E is based on the already known filter coefficient values Fx that the beamformer 130 provides, and the filter values Hx of the present state of the acoustic echo canceller 140 that is also known.

For example, Table 1 describes computing and using the relative transfer function E for improving performance of the acoustic processing system 100, using the current state of the acoustic echo canceller 140 and the beamformer filter coefficients. The table also depicts the actual transfer function that may have been used without the technical solutions described herein being implemented.

TABLE 1

| Event | Actual Transfer function | AEC transfer function |
|---|---|---|
| Initial state. (H and F are known). | H1F1 + H2F2 ... + HnFn | H1F1 + H2F2 ... + HnFn |
| Beamformer coefficients changed. | H1'F1' + H2'F2' ... + Hn'Fn' | H1F1 + H2F2 ... + HnFn |
| Calculate the relative transfer function: E = (H1F1' + H2F2' ... + |

TABLE 1-continued

| Event | Actual Transfer function | AEC transfer function |
| --- | --- | --- |
| HnFn')/(H1F1 + H2F2 . . . + HnFn) | | |
| Update the AEC filter | H1'F1' + H2'F2' . . . + Hn'Fn' | E(H1'F1+ H2'F2 . . . + Hn'Fn) |
| AEC adapts to the true H' | H1'F1' + H2'F2' . . . + Hn'Fn' | H1'F1' + H2'F2' . . . + Hn'Fn' |

As the beamformer coefficients change, the transfer function estimator 310 computes the relative transfer function E using the present Hx values, the present Fx values, and the updated Fx values. The acoustic echo canceller 140 is set to use the relative transfer function E. Further, the filter coefficients of the acoustic echo canceller 140 adjust to changes in H, if any, in course of operation, and starting from the relative transfer function E.

The transfer function estimator 310 may be executed by the speech control module 110. Alternatively, or in addition, the transfer function estimator 310 may be a separate electric circuit, such as an ASIC, FPGA, or any other hardware component that receives input signals from the one or more components of the acoustic processing system 100 and provides the relative transfer function for the acoustic echo canceller 140 as an output.

FIG. 4 depicts a flowchart of an example method for efficient echo cancellation using transfer function estimation according to one or more embodiments. The method includes receiving audio signals 124 captured by microphone array 120, as shown at 405. The audio signals 124 received include audio signal 154 that is broadcast by the loudspeaker 40, and thus includes echo components. The audio signals 124 are provided to the beamformer 130, which includes the one or more filter modules 132 to compute a beamformed output signal using the audio signals 124, which are received from the multiple microphones 122 of the microphone array 120, as shown at 410. In one or more examples, computing the beamformed output signal includes adapting filter coefficients (F) of the beamformer 130 where the filter coefficients F are updated to F', as shown at 410.

The method further includes notifying the transfer function estimator 310 of the updated filter coefficients F', as shown at 420. In response, the transfer function estimator 310 computes the relative transfer function (E) using the new beamformer filter coefficients (F') and present filter coefficients (H) of the acoustic echo canceller 140, as shown at 430. In one or more examples, the relative transfer function E is computed as shown in Table 1.

Further, the method includes using the relative transfer function E to adjust the filter coefficients (Hx) of the acoustic echo canceller 140, as shown at 440. For example, the filter coefficients H of the acoustic echo canceller 140 are adjusted by using convolution with the coefficients computed as the relative transfer function E.

The method further includes using the updated beamformer filter coefficients (F') to determine the beamformed output Y, as shown at 450. For example, the output Y is determined by computing a sum of convolution of the filtered coefficients F' and the signals from each of the microphones 122 of the microphone array 120. The output Y is then used as input to the acoustic echo canceller 140, which uses the relative transfer function E to determine the echo components in the beamformed signal Y, and adapts the filter coefficients H to updated values H', so as to reduce or eliminate the echo components from the audio output 154 of the speaker 40, as shown at 460.

The technical solutions described herein thus facilitate improvements to an acoustic processing system. The technical solutions described herein facilitates the improvements to the system irrespective of the type of beam forming algorithm used by the system. For example, the beam forming may be MVDR type, where the filter coefficients change over time to adapt to different noise conditions in the cabin, such as in the vehicle. The technical solutions described herein improves the performance of the system because the system no longer has to depend and/or wait for the adapting of the acoustic echo canceller to new echo paths that also includes the beamformer response. The technical solutions described herein facilitate calculating a relative transfer function using updated filter coefficients of the beamformer. The relative transfer function can be substantially immediately used as the transfer function of the acoustic echo canceller and the canceller can then converge to update the filter coefficients for modeling the echo components. Thus, the technical solutions described herein facilitate improvements over typical solutions where the acoustic processing system has to wait for a new response to be fed back from the acoustic echo canceller, because the system has to wait for the acoustic echo canceller to converge before the transfer function can be updated.

The technical solutions described herein further improve the computational power usage of the acoustic processing system. As described herein, the technical solutions facilitate using a single acoustic echo canceller, operating on the output of the beamformer, irrespective of a number of microphones in the microphone array. The usage of the single echo canceller reduces the computational resources used compared to multiple echo cancellers, one for each microphone, with a linear increase in the computation resources used per microphone added to the microphone array. Further, the technical solutions described herein use lesser computational resources compared to typical acoustic processing systems that wait for the acoustic echo canceller to converge, because adapting the acoustic echo canceller involves solving complex sets of equations (for example, matrix inversion) that use a more computation power than the computation of the relative transfer function as described herein. Further, by not having to wait for the acoustic echo canceller to converge, the technical solutions described herein facilitate a faster operation compared to a typical acoustic processing system.

Thus, the technical solutions described herein facilitate acoustic echo cancellation with improvements over typical implementations.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method for acoustic echo cancellation, the method comprising:
   computing, by a beamformer, a plurality of updated beamformer filter coefficients, the beamformer filter coefficients computed adaptively to determine a speech signal from a plurality of input audio signals;

computing, by a transfer function estimator, a relative transfer function based on the updated beamformer filter coefficients and a plurality of present acoustic echo canceller coefficients;

adjusting the plurality of present acoustic echo canceller coefficients using the relative transfer function, and generating an output speech signal, by an acoustic echo canceller, by cancelling echo components from the speech signal using the adjusted acoustic echo canceller coefficients; and sending, by the acoustic echo canceller, the output speech signal to a far end speech device.

2. The method of claim 1, wherein the relative transfer function is computed as $E=(H1*F'1+H2*F'2+\ldots Hn*F'n)/(H1*F1+H2*F2+\ldots Hn*Fn)$, where H1, H2 ... Hn are the plurality of present acoustic echo canceller coefficients, F1, F2 ... Fn are a plurality of beamformer filter coefficients at present, F'1, F'2 ... F'n are the plurality of updated beamformer filter coefficients, and E is the relative transfer function.

3. The method of claim 1, further comprising:
adapting, by the acoustic echo canceller, the adjusted acoustic echo canceller coefficients to updated acoustic echo canceller coefficients based on changes in cabin acoustics by continuously computing the updated beamformer filter coefficients.

4. The method of claim 1, wherein adjusting the present acoustic echo canceller coefficients comprises performing a convolution of the present acoustic echo canceller coefficients and the relative transfer function.

5. The method of claim 1, wherein the input audio signals are received from a microphone array comprising a plurality of microphones.

6. The method of claim 5, wherein the acoustic echo canceller is a single acoustic echo canceller, and wherein the single acoustic echo canceller is utilized irrespective of a number of microphones in the microphone array.

7. The method of claim 1, wherein the output speech signal comprises a command for the far end speech device.

8. A vehicle infotainment system comprising:
a microphone array comprising a plurality of microphones located in a cabin of a vehicle;
a loudspeaker configured to broadcast an output audio signal; and
a acoustic echo cancellation (AEC) system configured to cancel acoustic echo of the output audio signal from a plurality of input audio signals received by the microphone array, the AEC system comprising:
a beamformer configured to compute a plurality of updated beamformer filter coefficients, the beamformer filter coefficients computed adaptively to determine a speech signal from the input audio signals;
a transfer function estimator configured to compute a relative transfer function based on the updated beamformer filter coefficients and a plurality of present acoustic echo canceller coefficients; and
an acoustic echo canceller, wherein the plurality of present acoustic echo canceller coefficients are adjusted using the relative transfer function, the acoustic echo canceller configured to generate the output audio signal by cancelling echo components from the speech signal using the adjusted echo canceller coefficients.

9. The vehicle infotainment system of claim 8, wherein the relative transfer function is computed as $E=(H1*F'1+H2*F'2+\ldots Hn*F'n)/(H1*F1+H2*F2+\ldots Hn*Fn)$, where H1, H2 ... Hn are the plurality of present acoustic echo canceller coefficients, F1, F2 ... Fn are a plurality of beamformer filter coefficients at present, F'1, F'2 ... F'n are the plurality of updated beamformer filter coefficients, and E is the relative transfer function.

10. The vehicle infotainment system of claim 8, wherein the beamformer comprises a plurality of filter modules, each filter module corresponding to a microphone from the plurality of microphones from the microphone array.

11. The vehicle infotainment system of claim 8, wherein the acoustic echo canceller adapts the adjusted acoustic echo canceller coefficients based on cabin acoustics.

12. The vehicle infotainment system of claim 8, wherein adjusting the present acoustic echo canceller coefficients comprises performing a convolution of the present acoustic echo canceller coefficients and the relative transfer function.

13. The vehicle infotainment system of claim 8, wherein the acoustic echo canceller is a single acoustic echo canceller, and wherein the single acoustic echo canceller is utilized irrespective of a number of microphones in the microphone array.

14. The vehicle infotainment system of claim 8, wherein the output audio signal comprises an audio command.

15. A computer program product comprising a storage memory device having computer executable instructions stored therein, the computer executable instructions when executed by a processing unit cause the processing unit to perform acoustic echo cancellation that comprises:
computing, by a beamformer, a plurality of updated beamformer filter coefficients, the beamformer filter coefficients computed adaptively to determine a speech signal from a plurality of input audio signals;
computing, by a transfer function estimator, a relative transfer function based on the updated beamformer filter coefficients and a plurality of present acoustic echo canceller coefficients;
configuring an acoustic echo canceller by adjusting a plurality of present acoustic echo canceller coefficients using the relative transfer function, and generating an output speech signal, by the acoustic echo canceller, by cancelling echo components from the speech signal using the adjusted acoustic echo canceller coefficients; and
sending, by the acoustic echo canceller, the output speech signal to a far end speech device.

16. The computer program product of claim 15, wherein the relative transfer function is computed as $E=(H1*F'1+H2*F'2+\ldots Hn*F'n)/(H1*F1+H2*F2+\ldots Hn*Fn)$, where H1, H2 ... Hn are the plurality of present acoustic echo canceller coefficients, F1, F2 ... Fn are a plurality of beamformer filter coefficients at present, F'1, F'2 ... F'n are the plurality of updated beamformer filter coefficients, and E is the relative transfer function.

17. The computer program product of claim 15, the acoustic echo cancellation further comprising:
adapting, by the acoustic echo canceller, the adjusted acoustic echo canceller coefficients to cabin acoustics by continuously computing the updated beamformer filter coefficients.

18. The computer program product of claim 15, wherein adjusting the present acoustic echo canceller coefficients comprises performing a convolution of the present acoustic echo canceller coefficients and the relative transfer function.

19. The computer program product of claim 15, wherein the input audio signals are received from a microphone array comprising a plurality of microphones.

20. The computer program product of claim 19, wherein the acoustic echo canceller is a single acoustic echo canceller, and wherein the single acoustic echo canceller is utilized irrespective of a number of microphones in the microphone array.

* * * * *